United States Patent [19]

Smith

[11] 4,438,327

[45] Mar. 20, 1984

[54] BAR CODE READING SYSTEM AND METHOD

[75] Inventor: Robert E. Smith, Tucson, Ariz.

[73] Assignee: Burr-Brown Research Corporation, Tucson, Ariz.

[21] Appl. No.: 370,373

[22] Filed: Apr. 21, 1982

[51] Int. Cl.³ .............................................. G06K 7/10
[52] U.S. Cl. .................................... 235/462; 235/463
[58] Field of Search ................................. 235/462, 463

[56] References Cited

U.S. PATENT DOCUMENTS 4,074,852 2/1978 Wescott .............................. 235/463

Primary Examiner—Harold I. Pitts
Attorney, Agent, or Firm—Cahill, Sutton & Thomas

[57] ABSTRACT

A bar code reading system having a wand that detects variations in light reflected by bars and spaces of the label produces a sequence of corresponding pulses and intervals as the wand scans the label. The entire sequence of pulses and intervals is input to a microprocessor system which produces corresponding digital duration numbers. The microprocessor system computes a reference number for a first character of the label and compares each digital duration number of the character to the reference number to compute a binary number with bits that are a "one" or a "zero" according to whether corresponding digital internal numbers exceed or are less than the reference number. If the number of "ones" in the binary number is too low or too high, the microprocessor decreases or increases the reference time, compares the digital duration number with the adjusted reference number, and re-determines if the resulting value of the binary number has the correct number of "ones". This compensates for variations in scan speed over different characters of the label.

20 Claims, 8 Drawing Figures

BAR CODE READING SYSTEM AND METHOD

BACKGROUND OF THE INVENTION

The invention relates to improved apparatus and methods for accurately reading bar code labels of the type including alternate dark bars and light spaces of varying widths to represent numeric and alphanumeric information.

Various "bar codes" that include alternate elongated dark bars and light spaces to represent digital and alphanumeric codes are commonly used. For example, the Universal Product Code (UPC) is commonly used on grocery products. Devices referred to as "bar code readers" are used to read and decode such bar code labels. Typically, a bar code reader includes a wand having a light emitting diode shining through an aperture at one end of the wand. The wand is held vertical relative to the bar code label and is passed rapidly from one end of the bar code label to the other. This is referred to as "scanning" of the label. A photosensitive device, such as a phototransistor, receives light that is emitted by the light emitting diode and is reflected by the light spaces between the dark bars of the label. The wand typically includes a single stage amplifier that amplifies the output signal produced by the photosensitive device. This signal, referred to as the "wand signal" or "analog signal", typically has an amplitude of roughly 200 to 300 millivolts. This signal is conducted by means of a flexible cable extending from the upper end of the wand to "wand conditioning circuitry" that further amplifies and "shapes" the wand signal to produce a "raw data" signal that includes a sequence of pulses and intervals therebetween. At a constant scan velocity, the widths of the pulses and intervals accurately correspond to the widths of the bars and spaces. In some known systems, for example, in one marketed by Interface Mechanisms, Inc. (hereinafter Intermech, Inc.) of Lynnwood, Wash., the signal produced by the wand conditioning circuitry is input to a microprocessor system that executes algorithms for converting the "raw data" signal into binary numbers, one such binary number corresponding to each "character" in the bar code label, and each bit having a logical state (either a "one" or a "zero") that corresponds to the width of a bar or space of the bar code label. Once the binary numbers are obtained, the characters represented thereby automatically can be obtained by reference to a look-up table.

Presently known bar code readers are not as accurate as could be desired in that they fail to accurately read some bar code labels. There are a number of factors which contribute to inaccuracies in bar code readers. The most important factor, for hand-held wands, is variation in the scan velocity of the wand as it scans from one end of the bar code label to the other. A user typically inadvertently increases the velocity of the wand relative to the bar code label as he or she overcomes the inertia of his or her arm and the wand itself during the scanning. The velocity of the wand at the end of the scanning often may be fifty percent (50%) greater than at the beginning of the scanning of a particular bar code label. Another factor that leads to difficulty and inaccuracy in converting the above-mentioned raw data to binary numbers representing the characters of the bar code label being scanned is the fact that often the color transition of a light colored space of a character to an adjacent dark bar of that character is not abrupt, but is somewhat gradual. Another factor that decreases the accuracy of a bar code reader is the presence of small phase errors in the wand conditioning circuitry as the low level analog signal is amplified and shaped to produce standard logic levels. The best prior wand reading systems are incapable of accurately reading bar code labels of poor "print" quality that produces blurred transitions from spaces to bars or wherein the user does not maintain relatively constant scan velocity of the wand. Therefore, there is an unmet need for an improved, more reliable, and more accurate bar code reading apparatus and method.

Accordingly, it is an object of the invention to provide an improved bar code reading apparatus and method that is less sensitive than the prior art to printing imperfections in bar code labels and is less sensitive to wand velocity variations during scanning of the bar code labels.

It is another object of the invention to provide a highly accurate and reliable bar code reading apparatus and method.

SUMMARY OF THE INVENTION

Briefly described, and in accordance with one embodiment thereof, the invention provides an apparatus and method for reading a bar code label by using a wand or photosensitive device to scan the bar code label and produce an analog signal representative of amounts of light reflected from bars and spaces of the bar code label, amplifying and shaping the analog signal to produce a raw data signal, measuring the durations of the pulses and intervals therebetween of at least a portion of the bar code label, producing and storing digital duration numbers representative of such durations, respectively, computing a reference number, comparing each of the digital duration numbers in a predetermined portion of the bar code label to the reference number, producing a binary number having bits that respectively correspond to the bars and spaces of the predetermined portion, each of the bits being a "one" if its corresponding digital duration number is greater than the reference number, determining if the binary number is acceptable in accordance with a predetermined criteria, adjusting the first reference number if the binary number is not acceptable, and recomparing the digital duration numbers to the adjusted reference numbers and determining if the resulting new binary number is acceptable. In the described embodiment of the invention, the analog signals are produced by a conventional bar code reader wand and the raw data signal is produced by conventional wand conditioning circuitry. The raw data signal is input to a microprocessor system that detects transitions in the raw data signal, measures the durations of the pulses and intervals of the raw data signal, and produces and stores corresponding digital duration numbers. The microprocessor system computes a reference number for a first character of the bar code label by dividing the sum of the digital duration numbers of the first character by eight (by performing a simple triple binary shift operation) in order to place an initial value of the reference number approximately midway between a "typical" lower digital duration number representing a "zero" and a "typical" upper digital duration number representing a "one" at the scan rate that occurred as the first character was scanned. All of the digital duration numbers of the first character then are compared to the reference number and are assigned the value of either a logical "zero" or a logical "one", depending upon whether they are less than or exceed the reference number, in order to produce the binary number, which represents the sequence of logical "ones" and "zeros" represented by the first character in the bar code label. In the described embodiment of the invention, the bar code label is a "CODE 39" bar code label, which requires that each character have exactly three logical "ones" therein. The microprocessor system determines if the first binary number includes exactly three logical "ones", and if it does, then refers to a stored look-up table to determine what the first character is. If the first binary number has more than three logical "ones" therein, the microprocessor system increases the first reference number by six and one quarter percent by performing a simple binary divide-by-sixteen shift operation) and then recompares the digital duration numbers of the first character with the adjusted reference number. The microprocessor system then produces a new value of the first binary number and determines if the new value of the first binary number now contains exactly three logical "ones". The microprocessor system repeats this process several times, if necessary, attempting to obtain a value of the first binary number which contains exactly three logical "ones". If the initial value of the first binary number contains less than three binary "ones", the microprocessor system decreases the initial value of the reference number by 6.25%, recompares the digital duration numbers of the first character with the adjusted value of the first reference number and determines if the resulting value of the first binary number contains three logical "ones", and, if necessary, repeats that process in further attempts to find an acceptable value of the first binary number. If no acceptable value of the first binary number has been obtained after modifying the value of the first reference number by a total of approximately thirty percent (30%), the microprocessor system determines that it is impossible to read the first character. In the described embodiment of the invention, a separate reference number is computed, and modified, if necessary, for each character in the bar code label in order to minimize the effect of variations in wand scanning speed, "print" imperfections in the bar code label, and phase errors introduced in the wand conditioning circuitry that produces the raw data signal in response to the analog signal. A "character window" that encompasses only a single character of the bar code label at a time is utilized to eliminate the effects of noise signals produced by the wand at times other than during the scanning of a character of the bar code label.

DESCRIPTION OF THE INVENTION

Figure 1A:
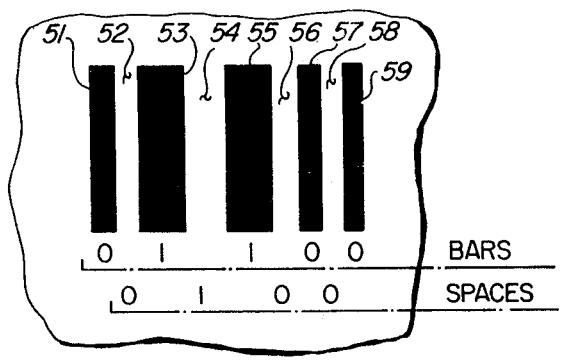
FIGS. 1A and 1B illustrate bar code elements and characters and are helpful in explaining the invention.

One commonly used bar code, referred to as "Code 39", is used as an example to facilitate description of the present invention. FIG. 1A shows a magnified diagram of the "6" character for the Code 39 character set. The other characters of the Code 39 character set are shown in Appendix 1, attached hereto. Each character of the Code 39 bar code is made up of nine "elements". The nine elements include five "bars", for example, bars 51, 53, 55, 57 and 59 of the character 50 shown in FIG. 1A. The five bars of a character are respectively separated by four "spaces", such as spaces 52, 54, 56 and 58 in character 50. The width of each element represents its binary value. A narrow bar or space represents a binary "zero", and a wide bar or space represents a binary "one".

Figure 1B:
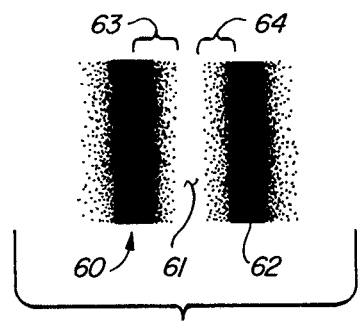

In FIG. 1B, the gradual transitions 63 and 64 between bars 60 and 62, respectively, and space 61 illustrate the previously mentioned transition problems that frequently cause prior bar code reading systems to fail to properly read imperfectly printed or reproduced bar code labels.

Each wide elements, be it a bar or a space, is 2.2 times the width of any narrow elements (which, of course, can be either a bar or a space).

Figure 2A:
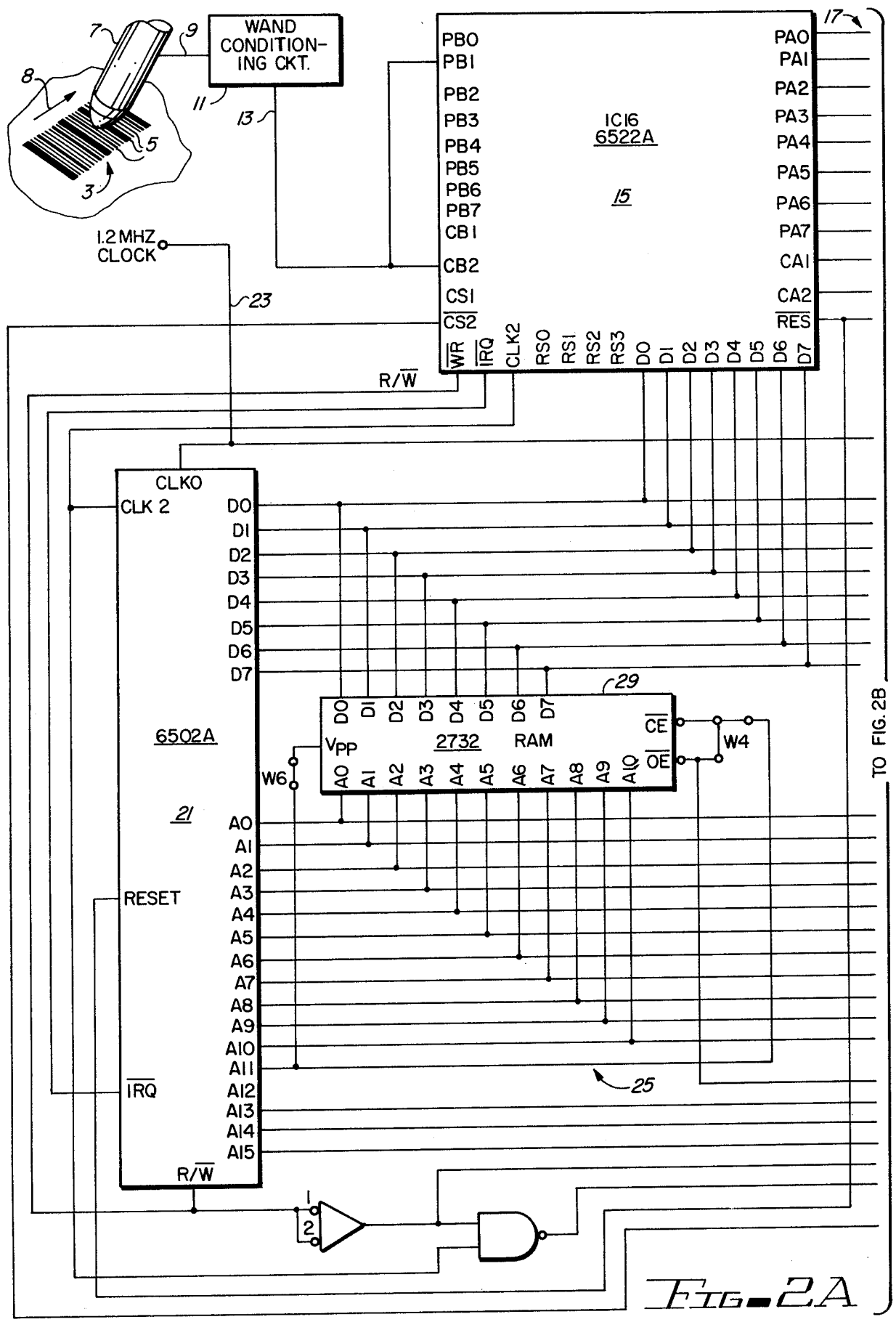
FIGS. 2A and 2B constitute a block diagram of one embodiment of the present invention.
Figure 2B:
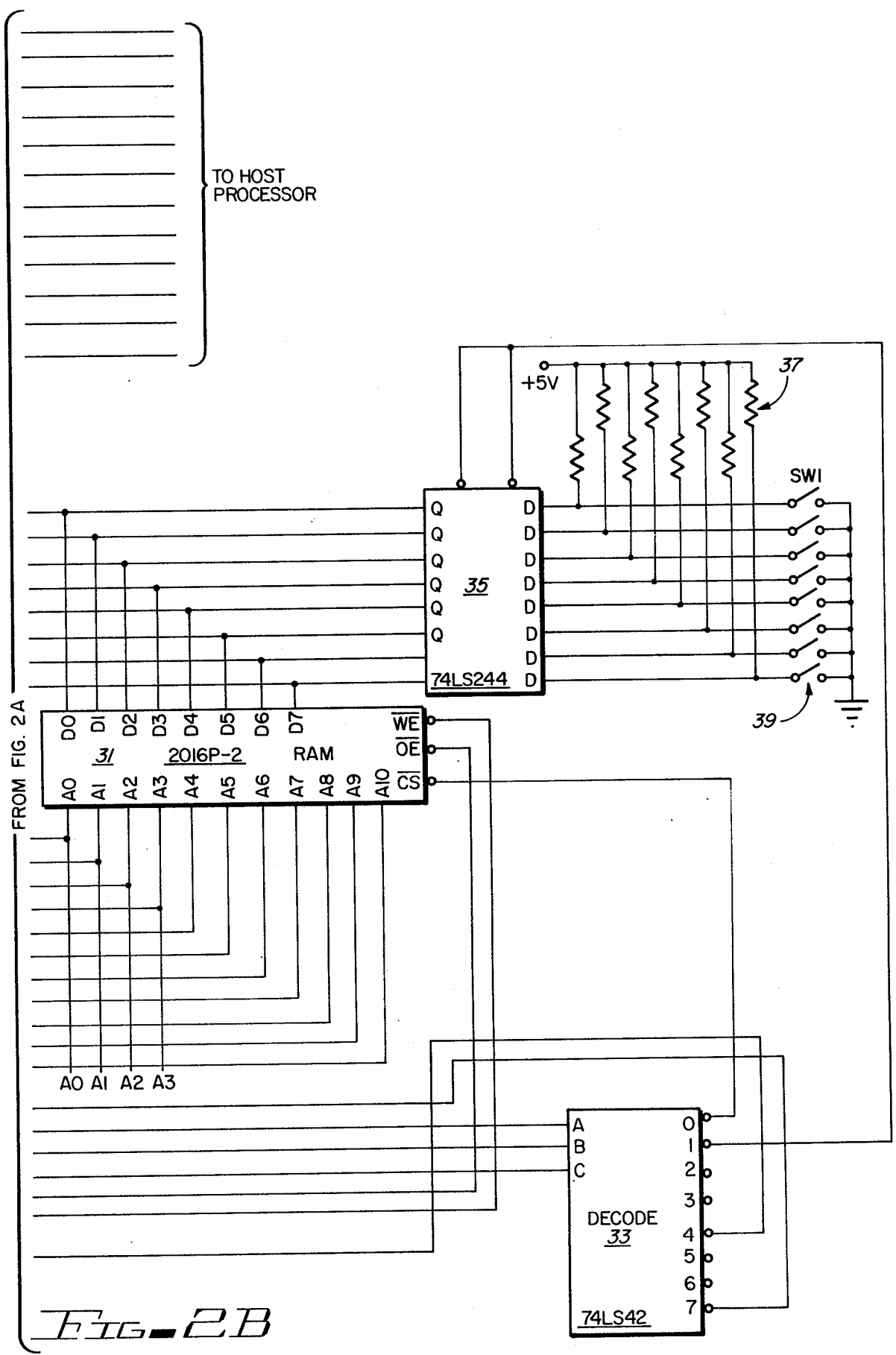

With the foregoing background, it will now be convenient to refer to FIGS. 2A and 2B to describe the structure of bar code reader system 1, wherein reference numeral 3 designates a bar code label 3 that includes a "start" character and a plurality of bar code characters generally designated by reference numeral 5. Reference number 7 designates a hand-held wand which is moved (for example) in the direction indicated by arrow 8 by a user with the lower end of wand 7 adjacent to a bar code label 3. A light emitting diode, a conventional photosensitive device, and an amplifier contained in wand 7 cooperate to produce an analog wand signal on flexible conductor 9. Conductor 9 is connected to an input of a conventional wand conditioning circuit 11. The wand 7 and a system including wand conditioning circuit 11 are well known in the art, and are available as components of a bar code reader system that is commercially available from, for example, Intermech, Inc.

The output of wand conditioning circuit 11 is connected to the CB2 input of a timer circuit 15, which is implemented by means of a Synertek 6522A peripheral device that includes a timer and has the capability of detecting transitions of the raw data signal on conductor 13. Peripheral circuit 15 generates an interrupt signal on its IRQ input of microprocessor 21, which is implemented by means of a Synertek 6502A microprocessor. The data bus terminals of both microprocessor 21 and peripheral chip 15 are connected to the eight data bus conductors designated by reference numeral 19.

A read only memory 29, which is implemented by means of a 2732 read only memory integrated circuit, has its data bus terminals connected to the respective data bus conductors 19. A random access memory 31, which is implemented by means of 2016P integrated circuit random access memory, has its data bus terminals connected to the respective conductors of data bus 19. Address bus 25 has its respective conductors connected to corresponding address outputs of microprocessor 21 and corresponding address inputs of read only memory 29 and random access memory 31. A decoder chip 33, which can be implemented by means of a 74LS42, has 3 address inputs connected to address outputs of microprocessor 21 which are decoded to generate chip select inputs required by peripheral chip 15, read only memory 29, random access memory 31, and latch circuit 35. Latch circuit 35 can be implemented by means of a 74LS244 integrated circuit.

Eight manual switches 39 are connected to corresponding inputs of latch circuit 35 in order to enable the user to manually select which of a plurality of different types of bar codes that system 1 is set up to read. The outputs of the latch circuit 35 can be read by microprocessor 21, as those outputs are connected to the respective conductors of data bus 19. The I/O ports 17 of peripheral chip 15 enable the system 1 of FIGS. 2A and 2B to communicate with, for example, a host computer.

Figure 3A:
FIG. 3A is a diagram of a typical bar code character.
Figure 3B:
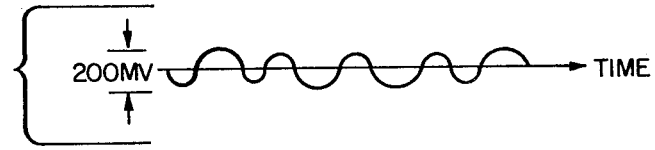
FIG. 3B is a waveform of a wand output signal produced in response to scanning of the character shown in FIG. 3A.

Referring now to FIG. 3A, the Code 39 bar code "start" character is illustrated. FIG. 3B illustrates the wand analog output signal that would appear on conductor 9 of FIG. 2A in response to scanning the start character of FIG. 3A from left to right. The "zeros" and "ones" shown above the respective bars and spaces in FIG. 3A designate the logical states represented by those respective bars and spaces, as can be verified by reference to the table for Code 39 shown in Appendix 1. The wand conditioning circuit 11 converts the 200 millivolt analog signal shown in FIG. 3B to the sequence of standard logic level pulses shown in FIG. 3C, wherein the logical "zeros" and "ones" shown in FIG. 3A are repeated in aligned relationship with the pulses and spaces between pulses to which they respectively relate.

Figure 3C:
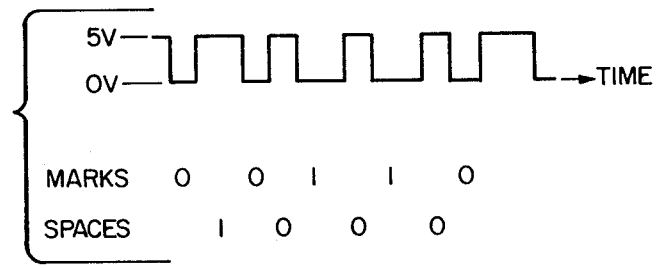
FIG. 3C is a "raw data" signal produced by a wand conditioning circuit in response to the wand output signal of FIG. 3B.

It should be appreciated that the time (t) scale shown in FIGS. 3B and 3C is not necessarily linear and, in fact, would be linear only if the user scans the start character of FIG. 3A at a precisely constant velocity. Any variations in scan velocity will result in corresponding variations in the time scale of FIGS. 3B and 3C. As previously mentioned, normally a user will greatly increase the velocity of the wand between the leading and trailing edge of a bar code label just because of the overcoming of the inertia of his own arm. As previously mentioned, this scanning velocity variation is one of the important factors limiting the accuracy and reliability of known bar code readers.

To avoid the above-mentioned problems caused by wand velocity variation, phase delays in the wand conditioning circuitry, and printing imperfections in the bar code label, system 1 collects and stores all of the "raw data" produced on conductor 13 in response to scanning of the entire bar code label 5. The raw data (in the form of pulses and intervals therebetween) is, in effect, converted to time measurements between transitions on conductor 13. Peripheral chip 15 interrupts microprocessor 21 each time a transition in the raw data signal on conductor 13 occurs, and microprocessor 21 reads the contents of a timer (which counts at a constant rate) in peripheral chip 15 in response to each interrupt. If the timer "times out" by running 53 milliseconds without the occurrence of a transition on conductor 13, microprocessor 21 interprets this as the end of the bar code label being scanned by wand 7. Whenever a transition on conductor 13 occurs before the timer in peripheral chip 15 times out, the timer is reset and again begins counting to measure the duration of the next pulse or interval (which represents a bar or space) on conductor 13.

These counts, referred to as digital duration counts, and which ideally would be equal to one value to represent a logical "one" and to another value to represent a logical "zero", vary considerably, because of the above described visual variation in scan velocity.

In accordance with the present invention, bar code reader system 1 attempts to compute an initial value of a "reference time" or "reference count" that is approximately midway between a typical upper digital duration count representing a "one" and a typical lower digital duration cunt representing a "zero" in a first character of the bar code label. Each stored digital duration count representing the scan time duration of a bar or space of that character then is compared with the initial computed value of the reference count, and is interpreted as a logical "zero" if that digital duration count is less than the reference count, or is interpreted as a logical "one" if that digital duration count exceeds the initial value of the computed reference count. The resulting binary number then represents and corresponds on a bit-to-element basis with the bars and spaces of the first character if that character has been accurately read.

In accordance with the present invention, the program then counts the number of logical "ones" in the binary number thus obtained by the present character. Recall now that for a Code 39 character, there must be exactly three logical "ones". In accordance with the present invention, if the number of logical "ones" obtained is less than three, the initial value of the reference count is decreased by a small percentage (6.25% which is obtained by a binary divide-by-sixteen operation), and then the above-mentioned comparison of the digital duration counts of the first character is performed again, but with respect to the modified or adjusted reference count. If the new value of the above-mentioned binary number contains the correct number of logical "ones" (i.e., three) for the present character, the raw data for that character is deemed to have been correctly interpreted. If less than three logical "ones" are obtained, the present value of the computer reference count is again decreased. This process is repeated up to as many as five times, until three logical "ones" are obtained. If, after upward adjustment of the initially computed reference count by as much as approximately 30% has not succeeded in obtaining three logical "ones" in the above binary number, microprocessor 21 assumes that the first character cannot be correctly read.

Similarly, if the initial comparison of the nine scan duration counts for the present character with the initial computed value of the reference count produces more than three logical "ones", the program automatically increases the initial value of the computed reference count by the small amount (6.25%), and repeats the comparison of the nine digital duration counts in the first character with the adjusted reference count, and if necessary, repeats the foregoing operation, until the binary number produced as a result of the comparing contains exactly three logical "ones". If three logical "ones" are not obtained by the time downward adjustment of the computed reference count equals approximately 30% of the initially computed value thereof, the program executed by microprocessor 21 assumes that it cannot read the first character.

In the above described computation, comparison with, and if necessary, adjustment of the reference count and recomparison of the digital duration counts with the adjusted reference count for each character in the label has been found to compensate very effectively for normal variations in wand velocity during scanning of a particular bar code label.

Figure 4:
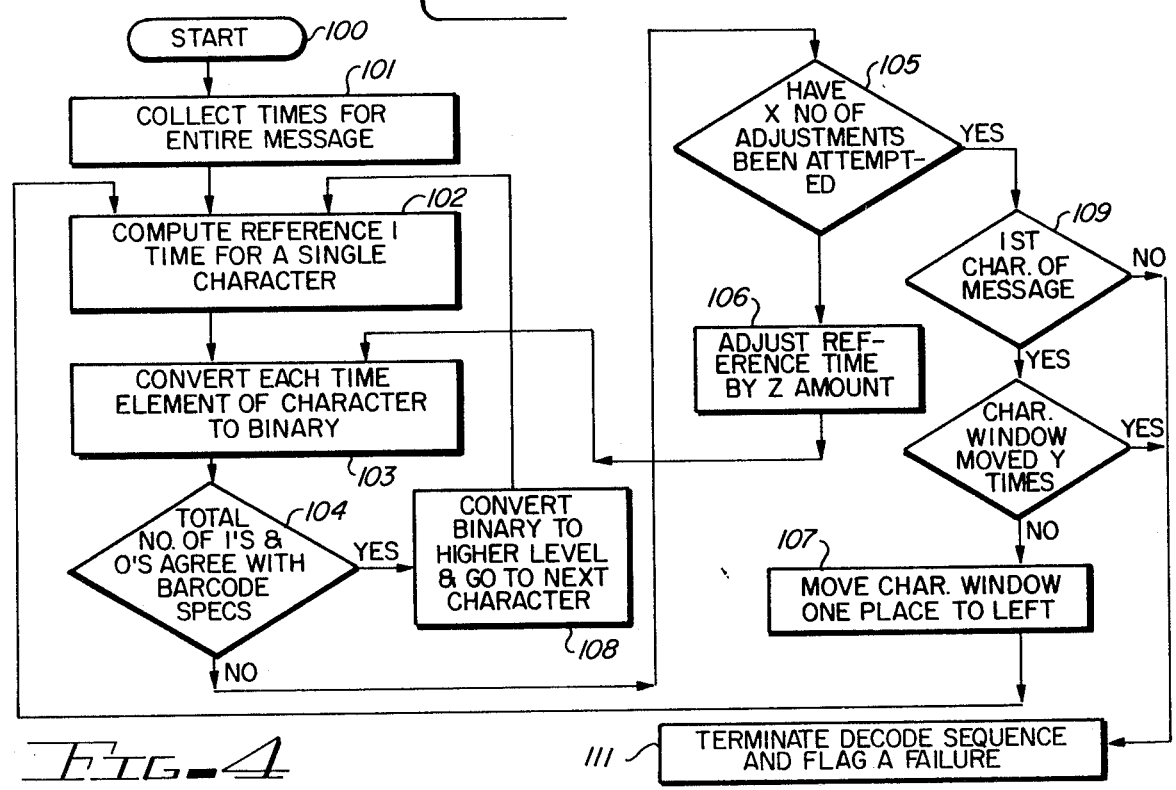
FIG. 4A constitutes a flow chart of the program executed by a microprocessor included in the block diagram of FIG. 2A.

At this point, it will be helpful to refer to FIG. 4 to more precisely explain how the foregoing process is performed by system 1. The flow chart shown in FIG. 4A is a functional flow chart of the above mentioned program executed by microprocessor 21 to convert the raw data signal on conductor 13 to a "high level" code representing the individual characters (groups of bars and spaces) comprising a sucessfully scanned bar code label. Appendix 2, attached hereto, contains code for the 6502A microprocessor 21 to implement the program described herein with reference to FIG. 4.

Referring now to FIG. 4, the program is entered at label 100 and goes to block 101. In block 101, microprocessor 21 responds to the interrupt produced on its IRQ input by peripheral chip 15 in response to each transition on conductor 13 and then reads the present contents of the internal timer of peripheral chip 15. The present contents constitute the digital duration count representing the width of the pulse or interval occurring between the two most recent transitions of conductor 13. This process continues for the entire bar code label until the internal timer times out at 53 milliseconds and generates another interrupt signal. At that time, the program recognizes that the digital duration counts have been collected and stored in memory for the entire bar code label. The program then goes to block 102.

In block 102, the program computes the above-mentioned reference count for the first character previously scanned. For economy of programming, the program divides the total of the nine element scan counts for the present character by eight, by simply performing three binary shifts to the right and using this number as the initial value of the reference count. The program then enters block 103 and compares each of the stored digital duration counts of the first character to the computed reference count, and if the previously read digital duration count is less than the reference count, the program sets it to a logical "zero"; if that digital duration count is greater than the reference count, the program sets it equal to a logical "one". The program then enters decision block 104 and checks the resulting nine bit binary number to see if it contains exactly three "ones" (for the described example of a Code 39 label). If this determination is affirmative, the program goes to block 108 and refers to a stored look-up table containing the information in Appendix 1 to determine what the first character is. The program then returns to block 102 and computes an initial reference time for a second character of the subject bar code label.

However, if the determination of decision block 104 is negative, the program goes to decision block 105. In decision block 105, the program determines whether more than five adjustments have been made to the initial computed value of the reference count for the first character. If this determination is negative, the program goes to decision block 106 and increases the present value of the reference time for the present character if the total number of "ones" in the above-mentioned nine bit binary number is greater than three, or decreases the present value of the referenced character if the number of ones in that nine bit binary number is less than three. In order to accomplish the computation of block 106 economically, the microprocessor simply shifts the present binary value of the reference count four times to the right, which is equivalent of dividing by 16 in binary. This produces a number equal to 6.25% of the present value. This value is added to the present value of the reference count in order to adjust it upward, or subtracted from the reference count in order to adjust it downward. The program then returns to block 103 and again compares each of the nine digital duration numbers to the adjusted value of the reference count to convert those digital duration counts to binary ones or zeros. If this adjustment of the reference count results in an affirmative decision in decision block 104 (before five adjustments to the reference count for the present character have been made), the attempt to read the present character has been successful, and the program goes to block 108 and converts the nine bit binary number most recently obtained in block 103 to a "higher level" code representing the first character by referring to the above-mentioned stored look-up table.

However, if after five attempts at adjusting the reference count for the present character, the correct number of "ones" has not been obtained, the determination of decision block 105 will be affirmative, and the program will go to decision block 109. In decision block 109, the program will determine whether the present character is the first character of the bar code label. If a determination of decision block 109 is negative, the program goes to block 111, terminates the decode sequence, and sets a flag indicating failure or inability to read the present bar code label. If the determination of decision block 109 is affirmative, then the program goes to decision block 110.

In order to understand decision block 110, it is necessary to realize that when performing a bar code scan, there is always a possibility of reading noise at the beginning of the bar code label because often the act of placing the wand tip against the label media may cause a transition in a logic level on conductor 13. Furthermore, the area preceding the beginning of a bar code label may contain a sufficiently dark extraneous region to cause an erroneous signal transition to be produced on conductor 13 prior to scanning of the bar code label itself. The program's attempt to interpret this transition could lead to difficulties. In accordance with the present invention, this type of "noise" is masked off by moving a "character window" that encompasses only one character at a time further "into" the previously collected and stored list of digital duration counts until the start character is found. If the start character cannot be found, a failure to read the present bar code label is indicated by the program. This situation corresponds to a positive determination by decision block 110. In block 197, the program performs the function of moving the above-mentioned "character window" until the start character is found.

The above described bar code reading system 1 has been tested on a variety of poor quality bar code labels and has been found to give over ninety-nine percent (99%) accurate readings. Bar code reader system 1 has been found to be capable of accurately reading "Code 39" bar code labels that have been reproduced three or four times by xerography from an original, even when the scanning by wand 7 is performed diagonally across the label.

Although only one specific embodiment of the invention has been described, the invention is intended to encompass all equivalent bar code reading systems that automatically compute a reference time or count and then automatically adjust that count in order to improve the conversion of raw data from the previous character into binary "ones" and "zeros" in accordance with particular criteria of the bar code being scanned.

The criteria may simply be that the binary number produced from the raw data be found in a look-up table of valid characters. Rather than base computation of a reference count on a complete character of the label, it could be based on some other portion or group of bars and spaces. Those skilled in the art will be able to make various modifications to the disclosed embodiment of the invention without departing from the true spirit and scope thereof.

What is claimed is:

1. A method of reading a bar code label, said method comprising the steps of:
   (a) producing an analog signal in response to scanning of the bar code label, said analog signal including signals representative of amounts of light reflected from bars and spaces of the bar code label, the widths of said bars and spaces being representative of whether said bars and spaces represent first or second logical states;
   (b) amplifying and shaping said analog signal to produce a raw data signal including a plurality of pulses, the durations of consecutive ones of said pulses corresponding to the widths of consecutive bars, respectively, of said bar code label, the durations of consecutive intervals between said pulses corresponding to widths of consecutive ones of said spaces, respectively, said bar code label including at least one character including a plurality of said bars and spaces;
   (c) measuring the durations of each of a plurality of said pulses and intervals of at least said one character of said bar code label to produce a plurality of digital duration numbers representative of said plurality of durations, respectively, and storing said plurality of digital duration numbers;
   (d) computing a first reference number;
   (e) comparing each of said digital duration numbers to said first reference number and producing a first binary number having a plurality of bits corresponding, respectively, to the bars and spaces of said character, each of said bits being equal to said first logical state if a corresponding one of said digital duration numbers is less than said first reference number, each of said bits being equal to said second digital state if a corresponding one of said digital duration numbers is greater than said first reference number;
   (f) determining if said first binary number is an acceptable number in accordance with a predetermined criteria, and decoding said first binary number, if it is acceptable, to determine what said character is; and
   (g) adjusting the value of said first reference number by a predetermined amount if said first binary number is not acceptable and repeating steps (e) and (f).

2. The method of claim 1 wherein said predetermined criteria includes a requirement that said first binary number has exactly a first predetermined number of bits equal to said first logical state.

3. The method of claim 2 wherein said adjusting includes decreasing said first reference number if the number of bits equal to said first logical state in said first binary number is less than said first predetermined number, whereby more of said digital duration numbers are likely to exceed the adjusted first reference number and thereby cause more bits of said first binary number to be equal to said first logical state.

4. The method of claim 2 wherein said adjusting includes increasing said first reference number if the number of bits equal to said first logical state in said first binary number is greater than said first predetermined number, whereby more of said digital duration numbers are likely to be less than the adjusted first reference number and thereby cause more bits of said first binary number to be equal to said second logical state.

5. The method of claim 1 wherein said bar code label includes a plurality of characters, and wherein step (c) is performed for said entire bar code label before step (d) is performed for a first one of said characters.

6. The method of claim 5 including computing a second reference number corresponding to another one of said characters.

7. The method of claim 1 wherein said first reference number is computed by performing a plurality of binary shifts on the sum of all of said digital duration numbers in said character and said predetermined amount of step (g) includes performing a plurality of binary shifts on said first reference number.

8. The method of claim 7 wherein up to five adjustments of the value of said first reference number are made.

9. The method of claim 1 wherein said decoding of said first binary number is performed by referring to a look-up table.

10. The method of claim 5 including selecting a character window that encompasses only one character at a time and moving said character to cause computing of a reference number only on the basis of digital duration numbers included in a character and completely encompassed by said character window, and thereby eliminate effects of noise signals that may be produced at times other than during scanning of characters of said bar code label.

11. A method of reading a bar code label, said method comprising the steps of:
(a) producing an analog signal in response to scanning of the bar code label, said analog signal including signals representative of amounts of light reflected from bars and spaces of the bar code label, the widths of said bars and spaces being representative of whether said bars and spaces represent first or second logical states;
(b) amplifying and shaping said analog signal to produce a raw data signal including a plurality of pulses, the durations of consecutive ones of said pulses corresponding to the widths of consecutive bars, respectively, of said bar code label, the durations of consecutive intervals between said pulses corresponding to widths of consecutive ones of said spaces, respectively, said bar code label including at least one portion including a plurality of said bars and spaces;
(c) measuring the durations of each of a plurality of said pulses and intervals of at least said one portion of said bar code label to produce a plurality of digital duration numbers representative of said plurality of durations, respectively, and storing said plurality of digital duration numbers;
(d) computing a first reference number;
(e) comparing each of said digital duration numbers to said first reference number and producing a first binary number having a plurality of bits corresponding, respectively, to the bars and spaces of said portion, each of said bits being equal to said first logical state if a corresponding one of said digital duration numbers is less than said first reference number, each of said bits being equal to said second logical state if a corresponding one of said digital duration numbers is greater than said first reference number;

(f) determining if said first binary number is an acceptable number in accordance with a predetermined criteria, and decoding said first binary number, if it is acceptable, to determine what said portion represents; and (g) adjusting the value of said first reference number by a predetermined amount if said first binary number is not acceptable and repeating steps (e) and (f).

12. A system for reading a bar code label, said system comprising in combination:

(a) means for producing an analog signal in response to scanning of the bar code label, said analog signal including signals representative of amounts of light reflected from bars and spaces of the bar code label, the widths of said bars and spaces being representative of whether said bars and spaces represent first or second logical states;

(b) means for amplifying and shaping said analog signal to produce a raw data signal including a plurality of pulses, the durations of consecutive ones of said pulses corresponding to the widths of consecutive bars, respectively, of said bar code label, the durations of consecutive intervals between said pulses corresponding to widths of consecutive ones of said spaces, respectively, said bar code label including at least one character including a plurality of said bars and spaces;

(c) means for measuring the durations of each of a plurality of said pulses and intervals of at least said one character of said bar code label to produce a plurality of digital duration numbers representative of said plurality of durations, respectively, and storing said plurality of digital duration numbers;

(d) means for computing a first reference number;

(e) means for comparing each of said digital duration numbers to said first reference number and producing a first binary number having a plurality of bits corresponding, respectively, to the bars and spaces of said character, each of said bits being equal to said first logical state if a corresponding one of said digital duration numbers is less than said first reference number, each of said bits being equal to said second logical state if a corresponding one of said digital duration number is greater than said first reference number;

(f) means for determining if said first binary number is an acceptable number in accordance with a predetermined criteria, and decoding said first binary number, if it is acceptable, to determine what said character is; and (g) means for adjusting the value of said first reference number by a predetermined amount if said first binary number is not acceptable.

13. The system of claim 12 wherein said predetermined criteria includes a requirement that said first binary number has exactly a first predetermined number of bits equal to said first logical state.

14. The system of claim 13 wherein said adjusting means includes means for decreasing said first reference number if the number of bits equal to said first logical state in said first binary number is less than said first predetermined number, whereby more of said digital duration numbers are likely to exceed the adjusted first reference number and thereby cause more bits of said first binary number to be equal to said first logical state.

15. The system of claim 13 wherein said adjusting means includes means for increasing said first reference number if the number of bits equal to said first logical state in said first binary number is greater than said first predetermined number, whereby more of said digital duration numbers are likely to be less than the adjusted first reference number and thereby cause more bits of said first binary number to be equal to said second logical state.

16. The system of claim 12 wherein said bar code label includes a plurality of characters.

17. The system of claim 16 including means for computing a second reference number corresponding to another one of said characters.

18. The system of claim 12 wherein said decoding of said first binary number is performed by referring to a look-up table.

19. The system of claim 16 including means for selecting a character window that encompasses only one character at a time and moving said character to cause computing of a reference number only on the basis of digital duration numbers included in a character completely encompassed by said character window, and thereby eliminate the effects of noise signals that may be produced at times other than during scanning of characters of said bar code label.

20. The system of claim 12 wherein:

(a) said analog signal producing means includes a wand;

(b) said measuring means includes a counter that counts at a predetermined rate; and (c) said computing means, said comparing means, and said adjusting means are included in a microprocessor system.

* * * * *